March 3, 1959            E. M. USAB            2,876,154

MEANS AND METHODS FOR ATTACHING CONNECTORS TO PLASTIC PIPE ENDS

Filed May 14, 1954

INVENTOR.
ERNEST M. USAB
BY HIS ATTORNEYS.
HARRIS, KIECH, FOSTER & HARRIS 2,876,154
Patented Mar. 3, 1959

2,876,154

MEANS AND METHODS FOR ATTACHING CONNECTORS TO PLASTIC PIPE ENDS

Ernest M. Usab, Gardena, Calif., assignor to Reflin Co., Gardena, Calif., a corporation of California Application May 14, 1954, Serial No. 429,961

6 Claims. (Cl. 154—83)

This invention relates to pipe constructions, and more particularly to the provision of attachment means to the ends of pipes for effectively joining one pipe section to another.

An important object of this invention is the provision of a successful method and a durable construction for the mounting of connector sleeves or fittings on the ends of rigid, cast plastic pipe lengths.

More specifically, it is an object of the present invention to provide a commercially practical method and means of attaching connecting members to the ends of cast plastic pipe so that the joints employed will not crack or otherwise become disrupted in use with resultant leaks and will not fail in use under any normal operating condition.

I have found that if plastic pipe is exteriorly threaded, whereby to thread on threaded couplings or kindred connector sleeves, such plastic pipe is unduly weakened and therefore is subject to failure by reason of leaks or rupture of the pipe adjacent the coupling near the ends of the threads, or for other reasons fails, even where such couplings or other fittings are cemented in place.

I have, however, discovered also that by very shallow roughening of the end portion of the plastic or equivalent pipe and then affixing to the pipe end a connector sleeve which is internally roughened, preferably to a greater degree than the roughening on the end of the pipe, so as to receive a liquid, settable plastic material which serves as a cement and within which preferably there is also provided a quantity of solid yieldable bodying material such as various fibrous materials, including cords wrapped arond a pipe, which fibrous materials are embedded in the settable plastic, the plastic material between the roughened surfaces of the pipe and the connector sleeve fills up the relatively small intervening spaces. Preferably the plastic material is thixotropic and may be made so by including an appropriate quantity of a mineral filler. The thixotropic condition facilitates application and the inert mineral filler reduces shrinkage to a negligible degree. Also, sand or similar rigid bodying material may be used instead of fibrous or yieldable bodying material. When the plastic is set, it adequately locks the connector sleeve on the pipe so that the sleeve will not pull loose and also so that the sealed joint will not crack and as a consequence leak or otherwise fail in normal use.

It is therefore another object of the invention to provide a connector sleeve upon the end of a length of plastic pipe by employing roughened opposing surfaces exteriorly on the pipe and interiorly on the connector sleeve and cementing the two parts together, more particularly where the cementing material contains solid locking particles, such particles including rigid materials like sand and yieldable substances like fibrous threads. More specifically, another object of the invention is to wrap small cord about the roughened surface on the pipe and employ threads within the connector sleeve or similar fitting, such sleeve being then threaded upon the cord following saturation thereof with an appropriate liquid, settable plastic cementing material. A further object is to use a non-shrinking cement to fill the joint space around the sand, fibrous cord, wrapping or similar bodying and locking agent.

Other objects of the invention, and the various features involved in the construction and its method of production will become apparent to those skilled in the art upon reference to the following specifications and the accompanying drawing wherein certain embodiments are illustrated.

Figure 1:
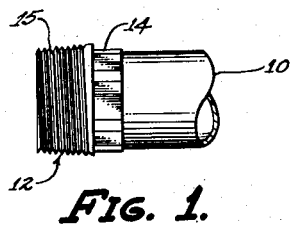
Fig. 1 is a side elevation on a small scale illustrating a metallic or plastic coupling member secured in accordance with the present invention upon an end of a length of cast plastic pipe or equivalent pipe.
Figure 3:
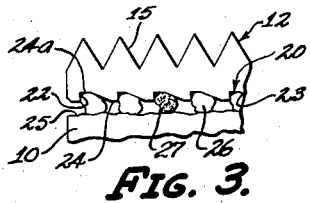
Fig. 3 is a fragmentary view on a scale comparable to that of Fig. 2 showing somewhat diagrammatically the terminal arrangement of the parts of the connection of Fig. 2.
Figure 2:
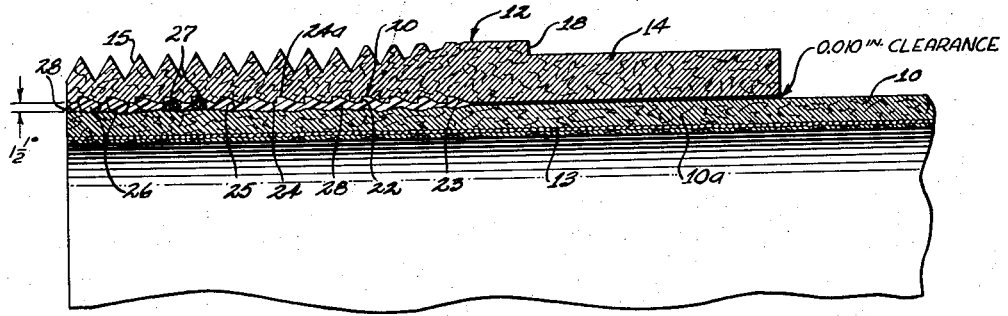
Fig. 2 is a longitudinal section on a much enlarged scale showing a fitting in the form of a connecting sleeve secured upon the end of the mentioned plastic pipe.

There is shown in Figs. 1, 2 and 3 an end of a cast plastic pipe 10 upon which there is mounted in accordance with this invention a connector sleeve 12. The cast plastic pipe illustrated is one which is reinforced, as with a fabric of the glass wool type which may be a woven fibrous glass material 13 that is embedded in the inner wall of the pipe 10 in such a manner that a smooth inner layer 10a of the plastic is provided in the finished product.

The connector sleeve 12 illustrated is, in a preferred form, produced with a rearward comparatively plain section 14, which may serve as a protective element for the adjacent portion of the plastic pipe 10 as presently to be described, the connector sleeve 12 also including, for example, a threaded attachment section 15 which may approximate in length about twice the length of the plain or protective section 14. Other attachment means than the threads may be employed, as is illustrated at 16 on the form of Fig. 4 and at 17 on the form of Fig. 5. In all of these forms a shoulder indicated at 18 divides the rearward portion 14 of the connecting sleeve from the forward attachment section 15, 16 or 17.

In all the forms the inner wall of the outer half or two thirds of the connecting sleeve 12 is provided with a preferably helical thread indicated at 20 which, preferably, is relatively more shallow than the normal type of thread such as indicated at 15, and may be a modified form of the so-called Acme thread. Thus, such helical thread has rearwardly faced, radially directed shoulders 22, that is shoulders which are directed perpendicularly to the axis of the sleeve 12, the thread portions also having sloping walls 23 directed inward and rearward at angles which may be around 20° to 25° to the mentioned axis. Between the foot of each sloping wall 23 and the next shoulder 22, in the form of Figs. 2 and 3, there is desirably an annular flat 24 which may approximate one fourth of the total width of the respective thread, and if desired there may be a similar flat 24a at the bottom of each thread.

Opposed to the helical thread 20 on the inner wall of the connecting sleeve 12, the outer surface of an end portion of the plastic pipe 10 corresponding in length with the length of the helical thread 20 is roughened as indicated at 25. Such roughening is very shallow and may be effected by stroking with a coarse file or by scoring circumferentially, as with the edge of a file, or both, as may seem most desirable. However, the depth of this roughening is very slight so that it does not significantly reduce the thickness of the pipe wall or detract from its strength. For example, the maximum depth of such roughening may be around only .005 or .006 inch, whereas even the shallow modified Acme thread 20 above described may have a depth approximating .030 inch.

In practice, the fitting or connecting sleeve 12, which may be of metal or a suitable rigid plastic stock as more fully discussed hereinafter, has an internal diameter such that it may be readily placed over the free end of the pipe 10 and slid backward therealong so as to expose the roughened portions 25 and provide a clearance of about 0.010 inch between the inner wall of the rearward portion 14 and the outer wall of the main surface of the cast pipe 10. The thickness of the rearward portion 14 of the sleeve 12, especially if it is produced of plastic material or fiber-reinforced plastic material, may be about one-fourth inch, whereas the thickness of the cast pipe 10, in practice with larger sizes, such as 4-inch diameter sizes, may be about one-eighth inch.

With the sleeve 12 slid rearward on the cast plastic pipe 10 to expose the roughened portion 25, the latter is then coated with a fluid, settable, appropriate plastic resin which will adequately serve as a satisfactory sealing or cementing agent in the finished joint. Desirably the fluid resinous material is thixotropic to facilitate application, and it may contain a quantity of inert mineral filler such as ground mica or asbestos or calcium carbonate powder which renders it thixotropic and at the same time eliminates shrinkage in the set joint. There is then wrapped about the roughened portion 25 a fibrous cord 26 which may be relatively soft, and may be fuzzy if desired, enough convolutions of the cord being applied to equal or approximate the number of convolutions of the helical thread 20. This might be, for example, about fifteen turns. Such a cord may have a diameter of one-sixteenth inch, or a little more or less. Or sand particles 27, or the like, or both fibrous and rigid bodying agents may be used, which, upon being applied, are then saturated with the same fluid settable resin or kindred plastic material as used to coat the roughened portion 25. The cord 26 or sand 27 having been saturated with the fluid resin described and the crevices between the turns thereof having been filled, the connecting sleeve 12 is then moved forward so that its forward end is flush with the forward end of the pipe 10. In one procedure, the cord 26 is wrapped around the roughened portion 25 of the pipe 10 in a direction corresponding with the direction of the internal thread 20 of the sleeve 12, and the sleeve 12 is moved forward on the pipe 10 in conjunction with a rotating motion simulating a threading motion, thereby facilitating the application of the sleeve 12 over the end of the pipe section. This operation having been completed, the small annular space between the helical thread 20 and the roughening 25 is completely filled with the cord 26 and with the fluid plastic material which is indicated at 28. When using sand 27, a similar state develops. The fluid plastic 28 is then caused or allowed to set.

As indicated, the annular clearance between the rearward portion 14 of the connecting sleeve 12 and the outer wall of the cast pipe 10 (0.010 inch) extends rearward from the inner terminus of the thread 20 on the inner wall of the sleeve 12. However, for the distance forward from such point, the spacing between the thread 20 and the roughened portion 25 of the outer end of the pipe is appreciably greater, for example 0.015 inch at the inner end to about 0.030 inch at the outer end, these being the average clearances between the flats 24 and the roughened portion 25. The indicated increase is due to a slight tapering of the thread 20 around 1° to 2°, or about 1.5° as indicated at the left of Fig. 2.

The settable plastic resin having become firmly set, by cold cure or by thermosetting according to the liquid resinous material selected, a highly valuable permanent joint results, the fibrous material, such as the fiber cord previously described, or sand or other rigid particles, being trapped and acting as locking material, especially in conjunction with the set plastic cementing agent. To indicate the very satisfactory nature of the bond between the connecting sleeve 12 and the roughened end of the cast plastic pipe 10, the pipe burst on pressure tests without the development of any leakage or other failure in the joint, where using four-inch diameter cast plastic pipe of polyester resins reinforced with fiber glass and employing a connector sleeve 12 made of similar material about four inches long, the connection and assembly having been produced as above described. The internal threads 20 in the connecting sleeve 12 were produced as above described.

Figure 4:
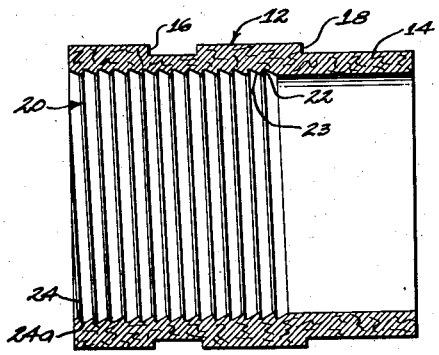
Fig. 4 is a longitudinal section on an intermediate scale, indicating another specific type of coupling.
Figure 5:
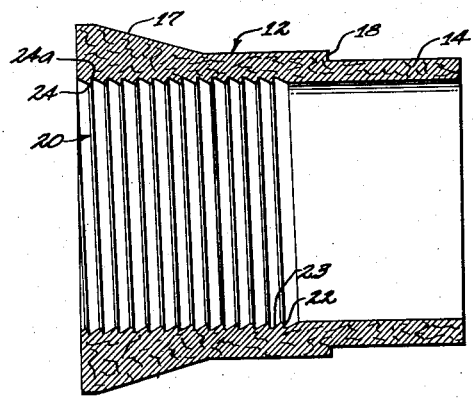
Fig. 5 is a view similar to that of Fig. 4 illustrating a further specific type of coupling means usable on cast plastic pipe.

Soft cord of synthetic fibers (e. g. "nylon") of approximately three-thirty-seconds inch diameter has been used; asbestos cord and cord of other fibers may also be used. Sand particles of suitable sizes have been used. Metal connector sleeves 12 such as stainless steel sleeves might also be used. The threads 20 of either type of sleeve may vary somewhat such as indicated in Fig. 4. Other pipe such as concrete pipe, metal pipe, ceramic pipe and the like, may also be equipped as described above.

The plastic fluid cements employed are desirably cold curing such as the well known epoxy resins. These cements should be tough and non-cracking as well as substantially non-shrinking when set. Other well known resins falling within the settable plastic resin definition of this case include the modified phenol formaldehydes, the epichlorohydrins, modified furfural ketones and the like. It is obvious that any durable plastic or resinous material which will set up permanently in the joint as a solid and effective seal without cracking or other failure, is appropriate for the purpose, as is well understood by those skilled in the plastics arts. In such a cementing material, the inert filler described not only substantially eliminates shrinkage, but it renders the cementing material substantially non-compressible when set and thereby further improves the permanence of the joint.

Inasmuch as other modifications of the generic invention herein disclosed will occur to those skilled in the art, it is intended to protect all such modifications as fall within the scope of the patent claims.

I claim as my invention:

1. A method of installing a sleeve fitting on a plastic pipe end, including the steps of: roughening externally an end section of a cast plastic pipe to a limited extent avoiding weakening of the pipe; placing upon the pipe, in a position back of said end section whereby to expose the roughened pipe end, a sleeve fitting having internal threads for normally overlying the roughened pipe end in slightly spaced relation; wrapping around said roughened pipe end a normally yieldable fibrous cord of a size to fill the spaces between said threads and the roughened surface of the pipe end; applying a fluid settable plastic resin material to said roughened surface and to said cord to saturate the latter and embed the same therein; then moving said sleeve fitting along on said pipe end section to cover said cord and embedding plastic material and to confine said cord and plastic material between said threads and roughened surface and fill the intervening space; and effecting setting of said plastic material in said intervening space to bind said fitting on said end of said pipe.

2. A method as in claim 1 wherein movement of said fitting to cover said cord and fluid plastic material includes rotating said fitting to thread it on said cord, said cord having been wound to conform with the direction of said threads, the cord following and occupying the threads.

3. A method of installing a sleeve fitting on a rigid plastic pipe end, including the steps of: roughening the external annular surface at the end of said plastic pipe while avoiding reducing the thickness of the pipe wall sufficient to weaken the pipe; introducing over the end of the pipe a rigid sleeve fitting having an internal diameter to provide for sliding the fitting back along the pipe end and thereby exposing the roughened portion of the pipe end, the inner wall of the forward portion of said fitting being internally scored relatively deeply to receive mobile and solid materials; applying a fluid, settable plastic material to said roughened surface; also applying mobile materials to said roughened surface and embedding such solid materials in said fluid material; and then returning said fitting along said pipe end to enclose said solid and embedding materials and fill therewith the annular space between said roughened surface and scored wall.

4. A method as in claim 3 wherein said fluid plastic material is thixotropic.

5. A method as in claim 3 wherein said mobile and solid materials include fibrous cord around said pipe end.

6. A method of installing a sleeve fitting on a pipe end, including the steps of: roughening externally an end section of a pipe and avoiding removal of material sufficient to weaken the pipe; placing upon the pipe, in a position back of said end section whereby to expose the roughened pipe end, a sleeve fitting having internal threads for normally overlying the roughened pipe end in slightly spaced relation; disposing around said roughened pipe end rigid particles of a size to fill the spaces between said threads and the roughened surface of the pipe end and embedded in a fluid settable plastic resin material; then moving said sleeve fitting along on said pipe end section to cover said particles and embedding plastic material and to confine said particles and plastic material between said threads and roughened surface and fill the intervening space; and effecting setting of said plastic material in said intervening space to bind said fitting on said end of said pipe.

References Cited in the file of this patent

UNITED STATES PATENTS

| Number | Name | Date |
|---|---|---|
| 180,911 | O'Neill | Aug. 8, 1876 |
| 418,247 | Stohlmann | Dec. 31, 1889 |
| 1,650,737 | Quinn | Nov. 29, 1927 |
| 1,827,297 | Moore | Oct. 13, 1931 |
| 1,869,105 | Johnson | July 26, 1932 |
| 1,876,586 | Austin | Sept. 13, 1932 |
| 2,051,557 | Hunziker | Aug. 18, 1936 |
| 2,053,807 | Wadsworth | Sept. 8, 1936 |
| 2,283,975 | Dillon | May 26, 1942 |
| 2,313,074 | Jewell | Mar. 9, 1943 |
| 2,346,051 | Seamark | Apr. 4, 1944 |
| 2,366,444 | Dorman | Jan. 2, 1945 |
| 2,498,831 | Veitch | Feb. 28, 1950 |
| 2,502,892 | Saylor | Apr. 4, 1950 |
| 2,617,672 | Nichols | Nov. 11, 1952 |
| 2,638,429 | Patterson | May 12, 1953 |
| 2,687,093 | Botts | Aug. 24, 1954 |

FOREIGN PATENTS

| Number | Country | Date |
|---|---|---|
| 507,685 | Belgium | Dec. 31, 1951 |